United States Patent [19]

Nishiyama et al.

[11] Patent Number: 4,955,386

[45] Date of Patent: Sep. 11, 1990

[54] PULSE DOPPLER FLOW SPEED METER

[75] Inventors: Hisashi Nishiyama; Kageyoshi Katakura, both of Tokyo; Shizuo Ishikawa, Kanagawa; Toshio Ogawa, Tokyo, all of Japan

[73] Assignee: Hitachi, Ltd., Tokyo, Japan

[21] Appl. No.: 456,608

[22] Filed: Dec. 27, 1989

Related U.S. Application Data

[63] Continuation of Ser. No. 277,543, Nov. 29, 1988, abandoned.

[30] Foreign Application Priority Data

Nov. 27, 1987 [JP] Japan .................................. 62-297573
Dec. 11, 1987 [JP] Japan .................................. 62-311951
May 20, 1988 [JP] Japan .................................. 63-121716

[51] Int. Cl.$^5$ .............................................. A61B 8/00
[52] U.S. Cl. .............................. 128/661.09; 73/861.25
[58] Field of Search ...................... 128/661.07–661.10; 73/861.25

[56] References Cited

U.S. PATENT DOCUMENTS

| | | | |
|---|---|---|---|
| 4,583,552 | 4/1986 | Iinuma | 128/661.09 |
| 4,660,565 | 4/1987 | Shirasaka et al. | 128/661.09 |
| 4,751,847 | 6/1988 | Katakura et al. | 73/861.25 |

Primary Examiner—Francis Jaworski
Attorney, Agent, or Firm—Antonelli, Terry, Stout & Kraus

[57] ABSTRACT

A pulse doppler apparatus transmits a ultrasonic sound wave at transmission intervals T and T+Ts alternately and iteratively, detects the phase difference attributable to the doppler shift in the reflected sound wave signal at the interval T and the phase difference in the reflected signal at the interval T+Ts sequentially, detects the difference between both phase differences, and transforms the difference into a doppler frequency. The apparatus includes an MTI filter which exerts the same filtering characteristics on the reflected sound signals at both intervals T and T+Ts.

9 Claims, 10 Drawing Sheets

PULSE DOPPLER FLOW SPEED METER

This application is a continuation of application Ser. No. 277,543, filed Nov. 29, 1988, now abandoned.

BACKGROUND OF THE INVENTION

The present invention relates to an apparatus for measuring the speed of an object using the ultrasonic sound wave, and particularly to an apparatus for measuring the blood flow speed in a biological body on a real-time basis.

Among the flow speed measuring apparatus, one system uses the pulsed continuous wave. The system generally has a highest measurable doppler frequency 1/2T for the pulse transmission iteration period T. Accordingly, by choosing the value of T in terms of the distance between the ultrasonic wave probe and the target object, the highest measurable flow speed is determined.

The inventors of the present invention proposed in U.S. Pat. No. 4,751,847 a new pulse doppler flow speed meter which sets two transmission iteration periods T and T+Ts so that the highest measurable doppler frequency is 1/2Ts, and consequently the above-mentioned highest measurable flow speed is increased by a factor of T/Ts. This improved pulse doppler flow speed meter, however, has an inferior s/n ratio if the reflected sound wave from the flowing object is weaker than that from stationary objects, resulting possibly in the inaccurate flow speed measurement.

SUMMARY OF THE INVENTION

An object of the present invention is to provide a doppler flow speed meter having the transmission system for enhanced highest measurable flow speed with the intention of further enhancing the s/n ratio.

A known technique for improving the s/n ratio of doppler apparatus is MTI (Moving Target Indication), and the above-mentioned object of the present invention is in other words to provide an MTI technique which can be applied to a pulse doppler flow speed meter having the transmission system for enhanced highest measurable flow speed.

Other objects of the present invention will become apparent from the following description of specific embodiments.

The invention features to include means of transmitting a pulsed continuous ultrasonic wave in at least first and second intervals alternately and iteratively and receiving the reflected wave from the object at each transmission, means of mixing the reflected signal at each reception with a reference wave to detect the phase signal, an MTI filter which filters with the same filtering characteristics the phase signal of the first transmission interval and the phase signal of the second transmission interval, first phase difference detection means which detects sequentially the phase difference between the MTI filter output at the present time point and the MTI filter output at the preceding time point, second phase difference detection means which detects in the output of the first phase difference detection means the phase difference between the first phase difference attributable to the first transmission interval and the second phase difference attributable to the second transmission interval, and means of transforming the output of the second phase difference detection means into the speed.

The first-order MTI filter used in the usual doppler apparatus eliminates stationary object signals through the differential computation between the phase signal at the present time point and the phase signal at the immediate-preceding time point, whereas the MTI filter of the present invention, in case of having alternating first and second transmission intervals, implements the differential computation between the phase signal at the present time point and the phase signal at the second-preceding time point.

More generally, when the first and second transmission intervals take place alternately, the MTI filter has a delay time which is equal to the sum in time of the first and second transmission intervals or a multiple thereof In another case when the first Consequently, the MTI filter has the same filtering characteristics (phase characteristics and gain characteristics) for both of the phase signal of the first transmission interval and the phase signal of the second transmission interval, and speed detection can be carried out correctly.

DESCRIPTION OF THE PREFERRED EMBODIMENTS

Figure 1:
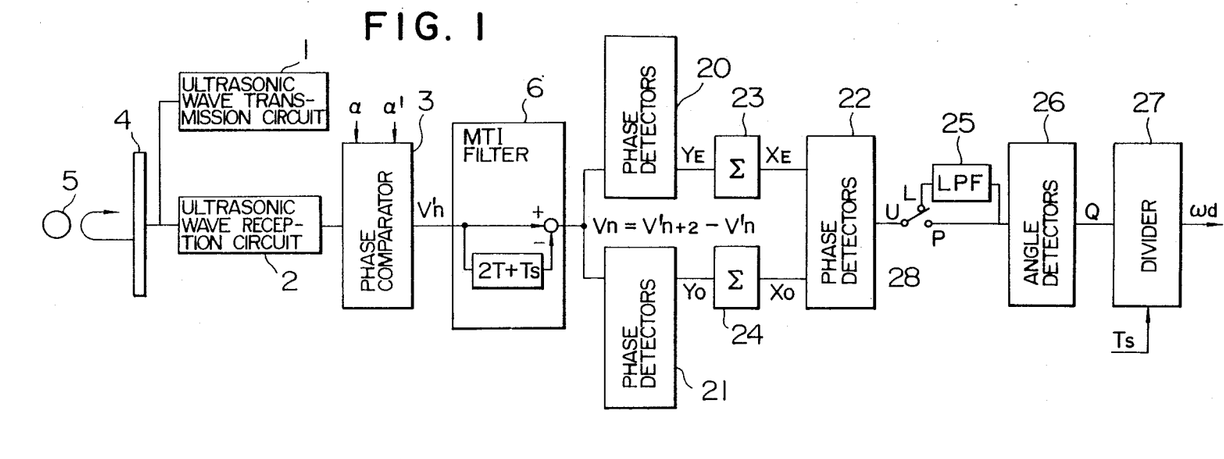
FIG. 1 is a block diagram showing an embodiment of the present invention.

FIG. 1 is a block diagram showing the pulse doppler apparatus embodying the present invention. The inventive pulse doppler apparatus comprises principally an ultrasonic wave transmission circuit, an ultrasonic reception circuit 2, a phase comparator 3, an ultrasonic wave transducer 4, a moving target indication (MTI) filter 6, phase detectors 20, 21 and 22, complex adders 23 and 24, a low-pass filter 25, an angle detector 26, and a divider 27. The transmission circuit 1 operates on the transducer 4 to emit an ultrasonic continuous wave toward a reflective object 5 in a first transmission interval T and second transmission interval T+Ts alternately and iteratively. The ultrasonic wave pulse reflected by the object 5 is received by the reception circuit 2 and subjected to phase comparison by the phase comparator 3 by being mixed with reference signals $\alpha = A \cos \omega_0 t$ and $\alpha' = A \cos \omega_0 t$.

Figure 2:
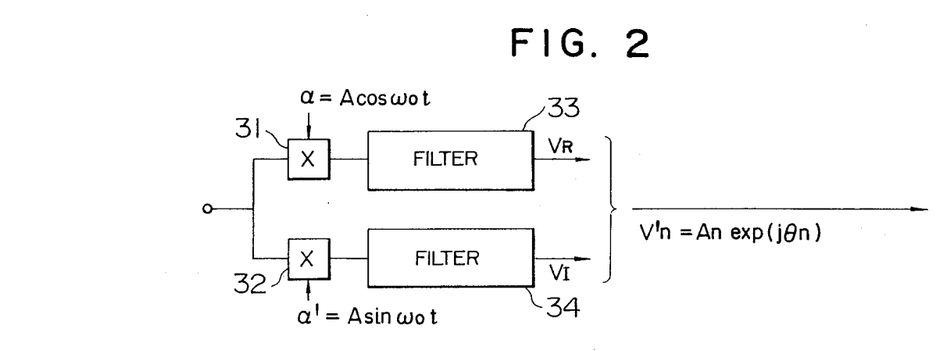
FIG. 2 is a schematic diagram of the phase comparator.

FIG. 2 shows the arrangement of the phase comparator 3, in which the signal from the reception circuit 2 is mixed with the reference signals $\alpha$ and $\alpha'$ by mixers 31 and 32, respectively. Low-pass filters 33 and 34 operate to conduct the low-frequency component of the mixed signals. In response to the iterative transmission, the filters 33 and 34 produce signals $V_{Rn}$ and $V_{In}$, where $n = 1, 2, 3, \ldots$, expressed as follows.

$$V_{Rn} = A_n \cos \theta_n \tag{1}$$

$$V_{In} = A_n \sin \theta_n \tag{2}$$

These values are expressed as phase vectors Vn' which indicate the phase of reflected waved, as follows.

$$V_n' = A_n \exp(j\theta_n) \tag{3}$$

Returning to FIG. 1, the MTI filter 6 implements filtering for the phase vectors $V_n'$ (n=1, 2, 3, ...) provided sequentially by the phase comparator 3 so as to eliminate stationary object signals. Specifically, the phase vector signal preceding by two unit times is subtracted from the phase vector signal at the present time point to produce filtered phase vectors Vn, as expressed in the following equation.

$$Vn = V_{n+2}' - V_n' \ (n=1, 2, 3, \ldots) \tag{4}$$

Accordingly, the MTI filter 6 is equivalent to the functional block as shown in block 6 of FIG. 1, in which the phase vector signal with a delay of 2T+Ts, which is the sum of the two transmission intervals occurring alternately, is subtracted from the phase vector signal at the present time point. The phase difference detectors 20 and 21 detect the phase difference occurring for the transmission interval T and the phase difference occurring for the transmission interval T+Ts, respectively. Namely, the detector 20 performs complex multiplication for the even-numbered one $V_{2k}$ and the complex conjugate vector $V^*_{2k-1}$ of preceding one $V_{2k-1}$ among successive phase vectors Vn, thereby producing a phase difference vector $Y_{Ok}$ given by the following equation.

$$Y_{Ok} = V_{2k} \cdot V^*_{2k-1} \tag{5}$$

The phase difference detector 21 performs complex multiplication for the odd-numbered one $V_{2k+1}$ and the complex conjugate vector $V^*_{2k}$ of preceding one among the phase vectors Vn, thereby producing a phase difference vector $Y_{Ek}$ given by the following equation.

$$Y_{Ek} = V_{2k+1} \cdot V^*_{2k} \tag{6}$$

Since these phase difference vectors $Y_{Ok}$ and $Y_{Ek}$ are susceptible of noises, cumulative means based on an arbitrary number (e.g., eight) of summations are calculated by the complex adders 23 and 24, as follows.

$$X_O = \frac{1}{N} \sum_{k=1}^{N} Y_{Ok} = \frac{1}{N} \sum_{k=1}^{N} V_{2k} \cdot V^*_{2k-1} \tag{7}$$

The vector $X_o$ has its deviation angle indicating the phase difference attributable to the doppler shift across the transmission interval T, while the vector $X_E$ has its deviation angle indicating the phase difference attributable to the doppler shift across the transmission interval T+Ts.

The phase difference detector 22 calculates the difference vector U for two phase differences from the $X_O$ and $X_E$, as follows.

$$U = X_E X_O^* \tag{9}$$

The difference vector U for two phase differences has its deviation angle Q in correspondence to the doppler shift across the interval Ts, and it is calculated by the angle detector 26, as follows.

$$Q = \tan^{-1}(U_I/U_R) \tag{10}$$

where $U_I$ is the imaginary part of U, and $U_R$ is the real part of U.

The divider 27 transforms the Q into the doppler frequency $\omega d$, as follows.

$$\omega d = Q/Ts \tag{11}$$

The $\omega d$ indicates the moving speed of the object 5. For example, if blood cells in a blood vessel are chosen as a reflective object, it represents the blood flow speed. When a switch 28 is set to the L position, the difference vector of two phase differences in terms of equation (11) is supplied to the angle detector 26 by way of a low-pass filter 28, which smooths the change by suppressing high-frequency components for the observation of changes in the blood flow speed at one point in the body.

Figure 3:
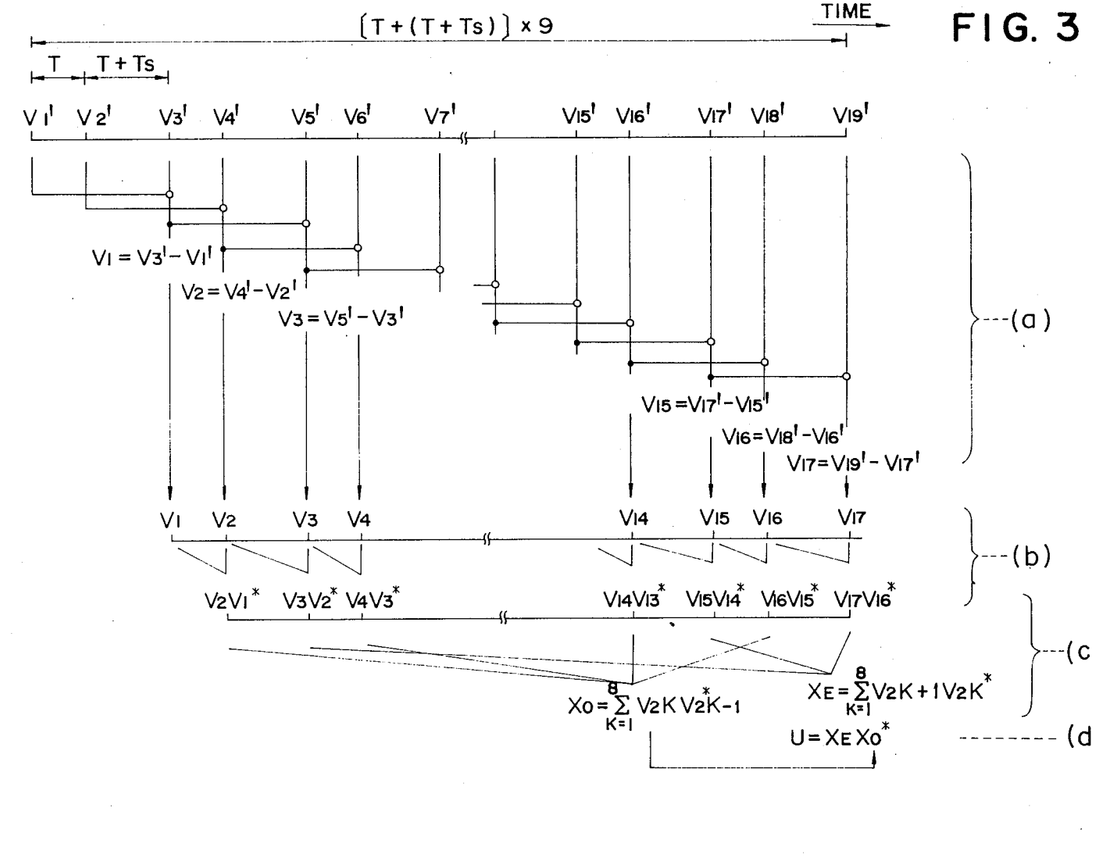
FIGS. 3 and 4 are conceptual diagrams showing the operation of the embodiment.

FIG. 3 depicts a series of the foregoing processes. Since the transmission of ultrasonic wave pulse takes place at intervals T and T+Ts alternately, the phase vectors Vn' produced by the phase comparator 3 align at unequal intervals. Shown by (a) is the operation of the MTI filter 6 based on equation (4), shown by (b) is the operations of the phase difference detectors 20 and 21 based on equations (5) and (6), shown by (c) is the operations of the complex adders 23 and 24 based on equations (7) and (8), and shown by (d) is the operation of the phase difference detector 22 based on equation (9). The figure shows an example in which the phase difference vectors $Y_{Ok}$ and $Y_{Ek}$ are each summed eight times to evaluate the mean phase difference vectors $X_O$ and $X_E$. In this case, the period of time necessary for evaluating the difference vector for two phase differences is 9(2T+Ts). As FIG. 2 suggests, the delay time implemented by the MTI filter 6 is not limited to the sum of two kinds of transmission intervals, 2T+Ts, but a multiple thereof is also allowed. The filter may be of second-order or higher, instead of being a first-order filter. Also in that case, the base delay time is set to 2T+Ts. By choosing the MTI filter as described, both of even-numbered and odd-numbered phase vectors are rendered the same filtering characteristics, i.e., phase characteristics and gain characteristics.

Although in the foregoing embodiment the transmission intervals T and T+Ts are iterated alternately to evaluate the cumulative means of $Y_{Ok}$ and $Y_{Ek}$, it may be modified such that transmissions at interval T take place for a plurality of cycles, which is followed by transmissions at interval T+Ts for a plurality of cycles. In such a case, the MTI filter 6 implements a delay Td in compliance with the following equation in place of 2T+Ts.

$$Td = rT = s(T+Ts) \tag{12}$$

where r and s are integers.

The above condition is met by setting T and T+Ts to have an integral ratio p:q. The r and s are given by the following equations, where c is a common multiple of p and q.

$$r = c/q, \ s = c/p \tag{13}$$

Figure 4:
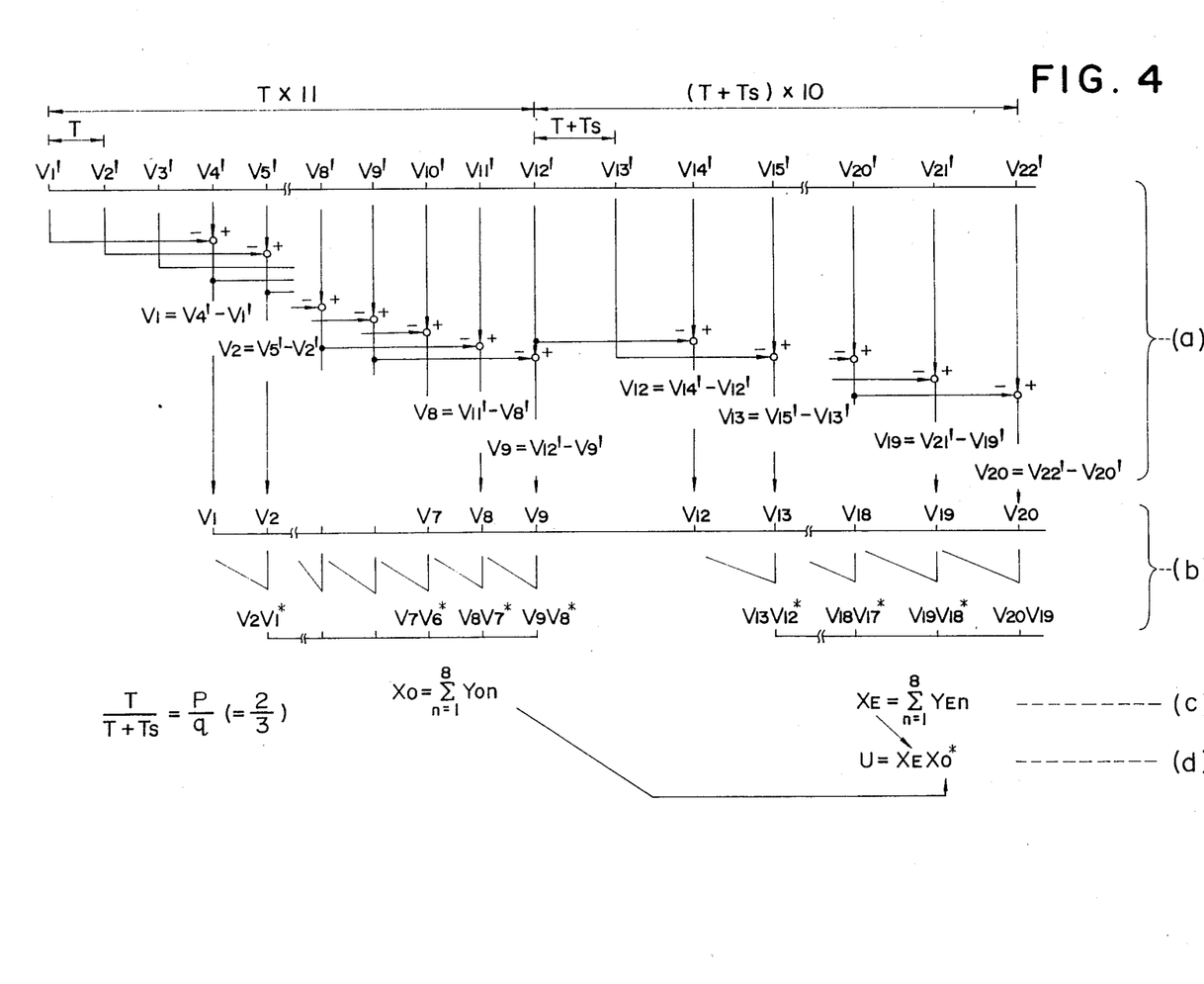

FIG. 4 shows an example of the case where the ratio of T to T+Ts is 2:3, with r and s being 3 and 2, respectively, and the phase difference vectors for intervals T and T+Ts are each summed eight times to evaluate their cumulative means. Transmission at interval T takes place 12 times consecutively, and the MTI filter produces filtered phase vectors Vn from the difference between the phase vector at the present time point and the phase vector at three unit times ago, as expressed by the following equation.

$$V_n = V_{n+3}' - V_n'$$

$$(n=1, 2, 3, \ldots, 9) \tag{14}$$

Subsequently, transmission at interval T+Ts takes place ten times, and the MTI filter 6 produces filtered phase vectors from the difference between the phase vector at the present time point and the phase vector at two unit times ago, as expressed by the following equation $$V_n = V_{n+2} - V_n'$$

$$(n=12, 13, \ldots, 20) \tag{15}$$

The above operation of the MTI filter 6 is shown by (a) in FIG. 4.

Of the phase vectors Vn produced sequentially, those Vn of n=1 to 9 at interval T are used for the calculation of phase difference vectors $Y_{On}$ by the phase difference detector 20, as follows.

$$Y_{On} = V_{n+1} \cdot V_n^*$$

$$(n=1, 2, \ldots, 8) \tag{16}$$

Phase vectors Vn of n=12 to 20 at interval T+Ts are used for the calculation of phase difference vectors $T_{En}$ by the phase difference detector 21, as follows.

$$Y_{En} = V_{n+12} \cdot V_{n+11}^*$$

$$(n=1, 2, \ldots, 8) \tag{17}$$

The above operations of the phase difference detectors 20 and 21 are shown by (d) in FIG. 4. The averaging process by the complex adders 23 and 24 and the calculation of difference vector U for two phase differences by the phase difference detector 22 are the same as the case of FIG. 2, and are shown by (c) and (d) in FIG. 3.

Figure 5:
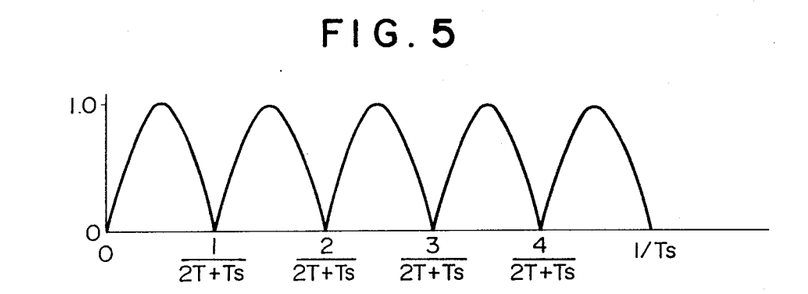
FIG. 5 is graph showing the filtering characteristics of the embodiment.

In the operation of FIG. 3, the MTI filter 6 has its filtering characteristics (gain vs. frequency characteristics) shown in FIG. 5, which include zero gain at frequencies that are multiples of 1/(2T+Ts). On this account, the doppler signal has its amplitude lowered in these frequency bands, resulting in an unfavorable signal-to-noise ratio. This shortcoming is overcome by another embodiment shown in FIG. 6.

Figure 6:
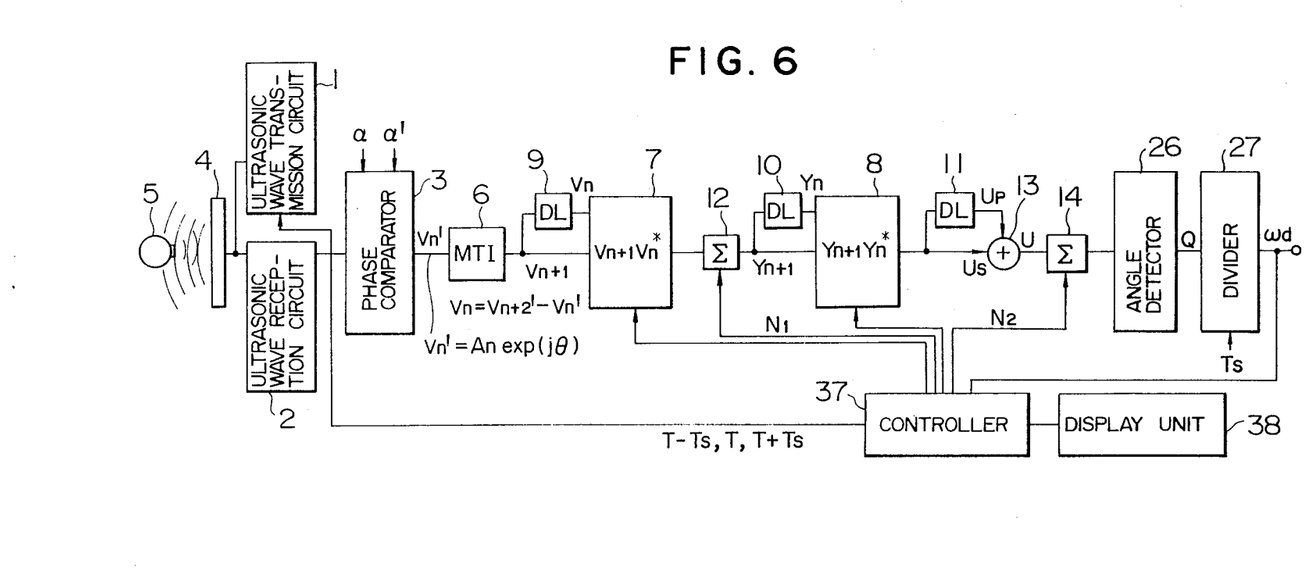
FIGS. 6, 7, 8 and 10 are a block diagram and conceptual diagrams according to the second embodiment of the present invention.

In FIG. 6, the portion including the transmission circuit 1, reception circuit 2, phase comparator 3 and MTI filter 6 is the same as of FIG. 1. In this case, however, the transmission circuit 1 is controlled by a controller 37 to implement two kinds of transmission intervals T-Ts and T alternately in the first period, and it implements two kinds of transmission intervals T and T+Ts alternately in the second period, thus having three kinds of transmission intervals. The MTI filter 6 performs the filtering process based on the difference between the phase vector of the present time point and that two unit times ago shown by equation (4) as in the case of FIG. 3. Accordingly, the delay time in the MTI filter is not constant as in the case of FIG. 3, but it is 2T-Ts in the first period and 2T+Ts in the second period.

An autocorrelator 7 works identically to the phase difference detectors 20 and 21 in FIG. 1. Namely, it implements the complex multiplication between the phase vector $V_{n+1}$ provided by the MTI filter and the complex conjugate vector Vn* of Vn at the preceding time point at the output of the delay element 9, and it produces phase difference vectors Ym as follows.

$$Y_m = V_{n+1} \cdot V_n^* \tag{18}$$

Another autocorrelator 8 works identically to the phase difference detector 22 in FIG. 1. Namely, it calculates the difference vector U for two phase differences corresponding to the two alternating transmission intervals, as follows.

$$U = Y_{n+1} \cdot Y_n^*$$

Since the alternating transmission intervals in the first period are T-Ts and T, the $Y_{n+1}$ and Yn are expressed as follows.

$$Y_n = A_n \ exp(j\omega d(T-Ts))$$

$$Y_{n+1} = A_{n+1} exp(j\omega d \ T) \tag{19}$$

Accordingly, the difference vector Up for two phase differences in the first period is given as follows.

$$U_p = A_n \cdot A_{n+1} \ exp(j\omega d \ T) \tag{20}$$

On the other hand, the alternating transmission intervals in the second period are T and T+Ts, the Yn and $Y_{n+1}$ are expressed as follows.

$$Y_n = A_n \ exp(j\omega d \ T)$$

$$Y_{n+1} = A_{n+1} exp(j\omega d(T+Ts)) \tag{21}$$

Accordingly, the difference vector Us for two phase differences in the second period is given as follows.

$$U_s = A_n \cdot A_{n+1} exp(j\omega d \ Ts) \tag{22}$$

As shown above, both the deviation angle of difference vector Up for two phase differences in the first period and the deviation angle of difference vector Us for two phase differences in the second period exhibit the doppler phase rotation across the time period Ts. The Up and Us are summed by a complex adder 13 so that they are averaged, the deviation angle Q of the averaged difference vector U for two phase differences is detected by the angle detector 26, and it is transformed into the doppler frequency ωd by the divider 27.

Figure 7:
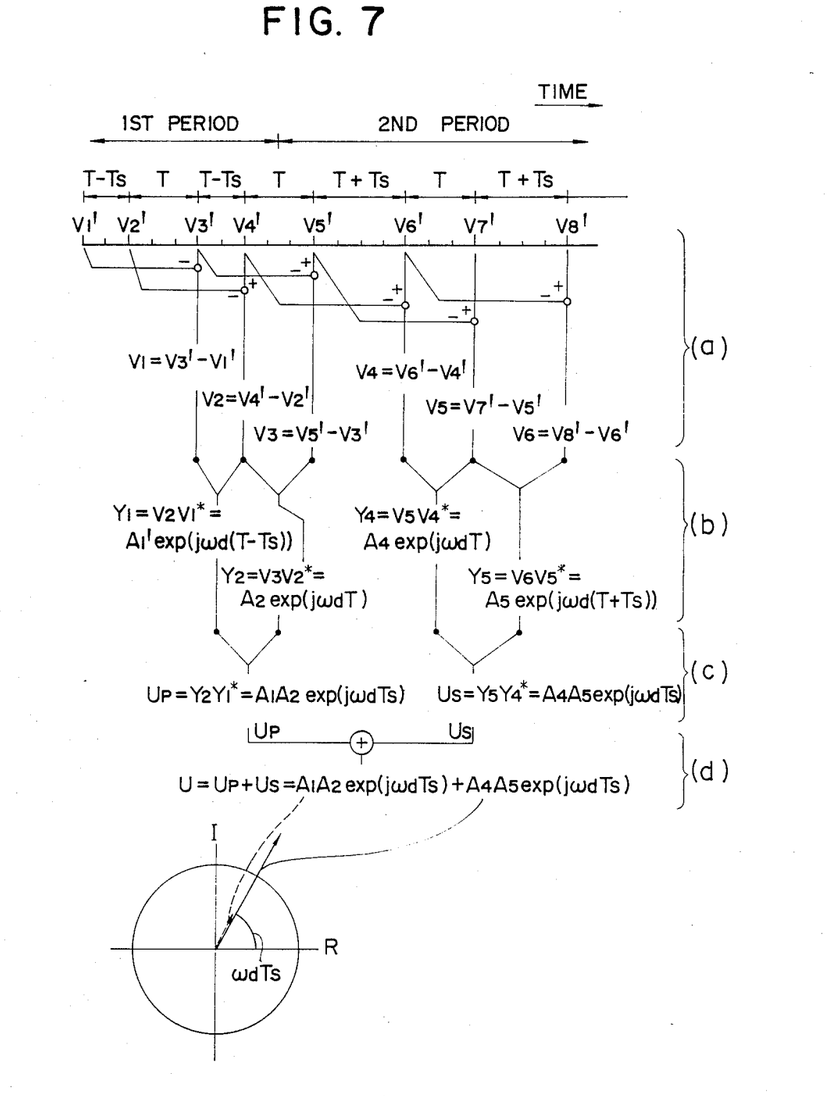

In general, transmissions of the first and second periods are repeated for a number of times to obtain many phase difference vectors Yn and $Y_{n+1}$. Here, for the easiness of understanding, the operation with a minimal repetition of transmission is shown in FIG. 7. Shown by (a) in FIG. 7 is the filtering operation by the MTI filter 6, (b) is the detection operation for the phase difference vectors Yn by the autocorrelator 7, (c) is the detection operation for the difference vectors Up and Us for two phase differences by the autocorrelator 8, and (d) is the cumulative averaging operation by the complex adder 13.

Figure 8:
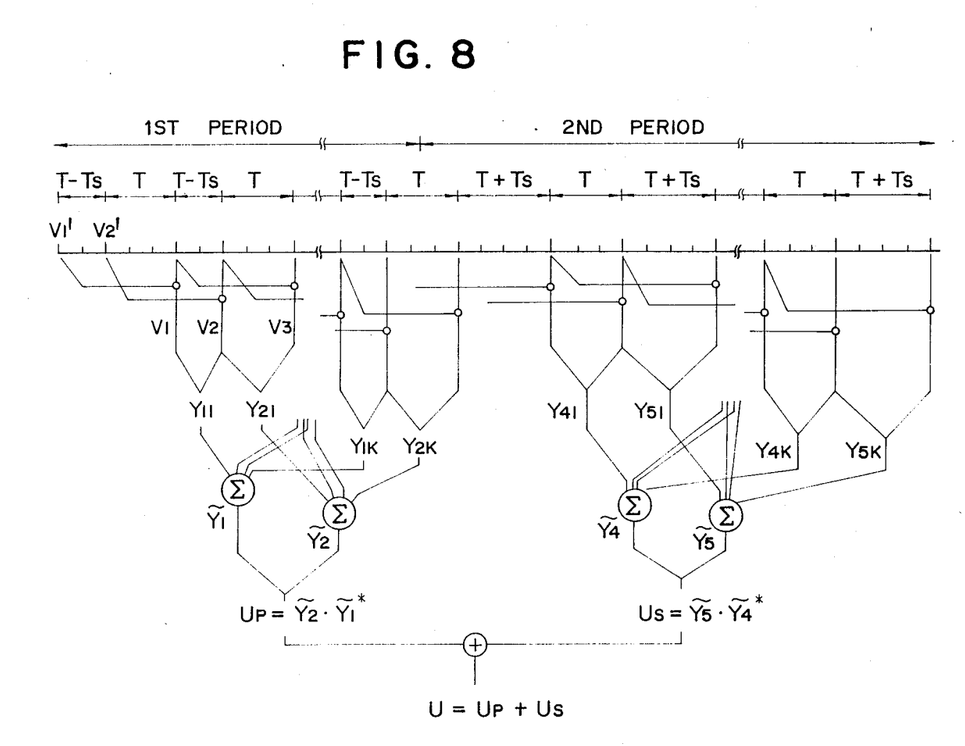

FIG. 8 shows the operation of the foregoing general case. In this case, the complex adder 12 in FIG. 6 is used. In the first period, the autocorrelator 7 produces sequential outputs Y11, Y21, Y12, Y22, Y13, Y23, and so on, and $Y_{1k}$ (k=1, 2, 3, . . .) are phase difference vectors for the transmission interval T-Ts, while $Y_{2k}$ (k=1, 2, 3, . . .) are phase difference vectors for the transmission interval T. The vector adder 12 sums these vectors to produce mean phase difference vectors $\overline{Y1}$ and $\overline{Y2}$, as follows.

$$\left. \begin{array}{l} Y_1 = \frac{1}{N_1} \sum_{k=1}^{N_1} Y_{1k} \\ Y_2 = \frac{1}{N_1} \sum_{k=1}^{N_1} Y_{2k} \end{array} \right\} \quad (23)$$

Similarly, in the second period, the complex adder 12 sums phase difference vectors $Y_{4k}$ (k=1, 2, 3, . . .) for the transmission interval T and phase difference vectors $Y_{5k}$ (k=1, 2, 3, . . .) for the transmission interval T+Ts to produce mean phase difference vectors as follows.

$$\left. \begin{array}{l} Y_4 = \frac{1}{N_1} \sum_{k=1}^{N_1} Y_{4k} \\ Y_5 = \frac{1}{N_1} \sum_{k=1}^{N_1} Y_{5k} \end{array} \right\} \quad (24)$$

The autocorrelator 8 uses the averaged phase difference vectors $\overline{Y1}$, $\overline{Y2}$, $\overline{Y3}$ and in place of Y1, Y4 and Y5 in the case of FIG. 7 to produce the difference vectors Up and Us for two phase differences. An adder 14 is used when further cumulative averaging is carried out for the difference vector U for two phase differences.

Figure 9A:
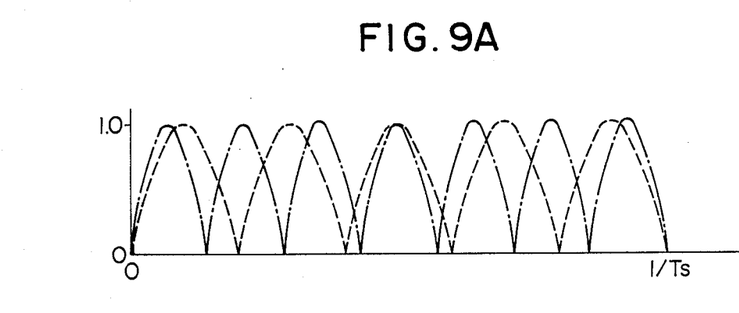
FIGS. 9A, B and C are a set of graphs showing the filtering characteristics of the second embodiment of the present invention.
Figure 9B:
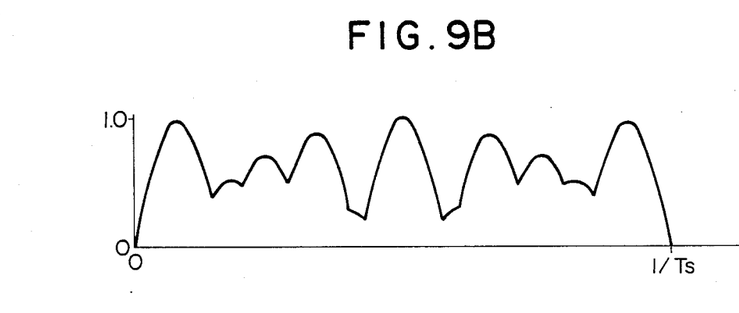

In the embodiment explained on FIGS. 6, 7 and 8, the MTI filter 6 has filtering characteristics of the first period as shown by the dashed line in FIG. 9A, and of the second period as shown by the dash-dot line. Since the difference vector Up for two phase differences in the first period and that of the second period are subjected to cumulative averaging, the filtering characteristics merged throughout both periods are as shown in FIG. 9B, and zero gain in the intermediate frequency bands vanish, allowing the entire speed measurement range to have a favorable s/n ratio.

Figure 9C:
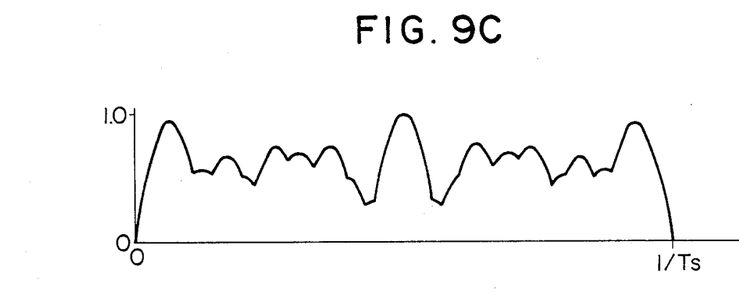
Figure 10:
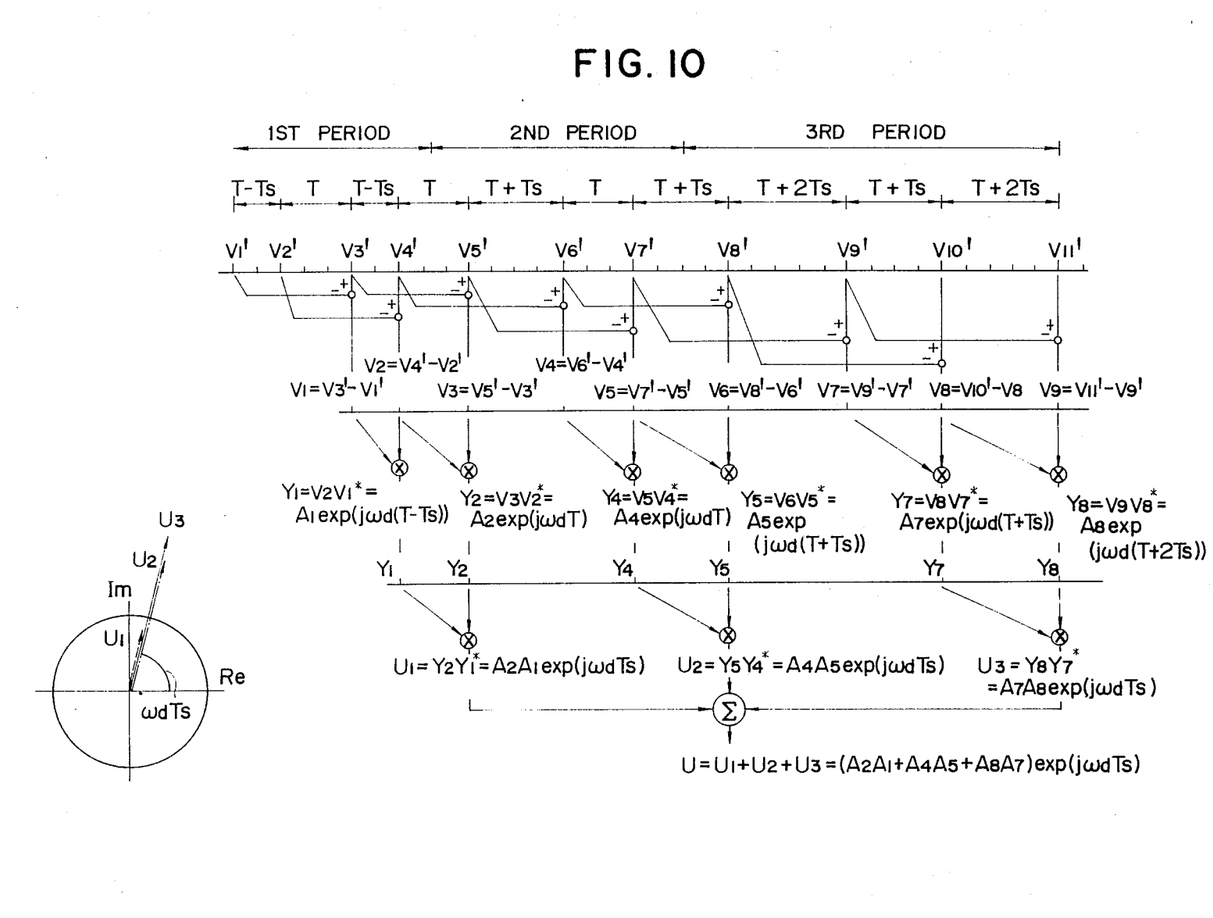

FIG. 10 shows a modified embodiment based on the preceding one shown in FIGS. 6-8, in which the first period includes alternating transmission intervals T-Ts and T, the second period includes alternating transmission intervals T and T+Ts, and the third period includes alternating transmission intervals T+Ts and T+2Ts. Such increased transmission modes causes the merged filtering characteristics to have further reduced low-response bands, and the s/n ratio is further improved. Shown in FIG. 9C are the merged filtering characteristics of the case of FIG. 10.

Figure 11:
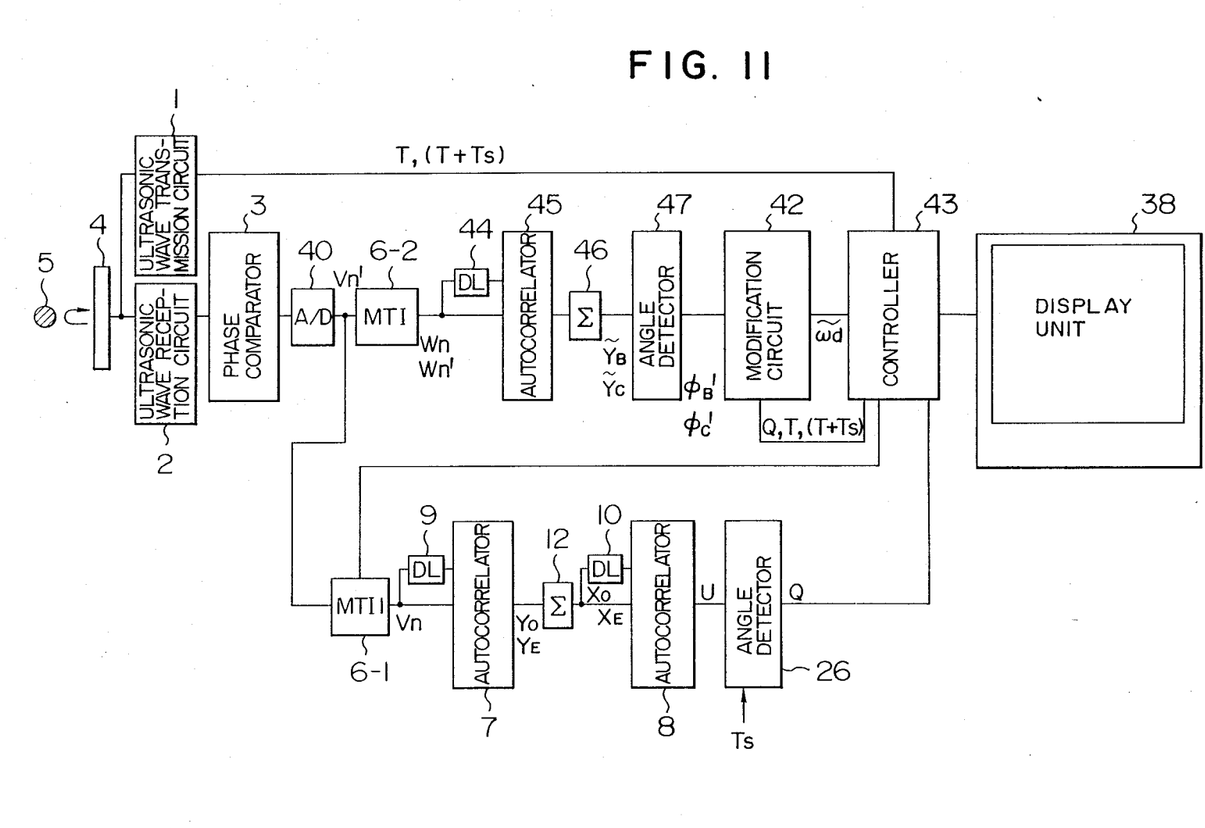
FIGS. 11 and 12 are a block diagram and conceptual diagram showing a further embodiment of the present invention.

FIG. 11 shows a further embodiment, which has the same transmission operation as the case shown in FIG. 4. The transmitter 1 iterates transmission at interval T, and subsequently iterates transmission at interval T+Ts. The phase comparator 3 produces phase vectors Vn', which are transformed into a digital signal by an A/D converter 40 and delivered to MTI filters 6-1 and 6-2. The operation of the portion from the MTI filter 6-1 up to the angle detector 26 is exactly the same as the case of FIG. 3, in which the MTI filter 6-1 implements a delay time Td which meets equation (12) to produce the phase vectors Vn by eliminating stationary object signals through first-order differentiation. The selfcorrelator 7 is equivalent to the phase difference detectors 20 and 21 in FIG. 1, and it produces the phase difference vectors $Y_{On}$ and $Y_{En}$ through the selfcorrelative operations similar to equations (16) and (17). The $Y_{On}$ having the phase difference for the transmission interval T and the $Y_{En}$ for the transmission interval T+Ts are subjected to cumulative averaging by a complex adder 12, and the $X_{On}$ and $X_{En}$ are produced. The selfcorrelator 8 performs the selfcorrelation process of equation (9) to produce the difference vector U for two phase differences. The angle detector 26 calculates equation (10) to evaluate the deviation angle Q of the difference vector for two phase differences. It should be noted that this embodiment differs from the preceding ones in that the deviation angle Q of the difference vector U for two phase differences is not directly used to calculate the doppler frequency $\omega d$, but it is used to modify the aliasing of the phase difference which is calculated on a conventional doppler flow speed meter.

Figure 12:
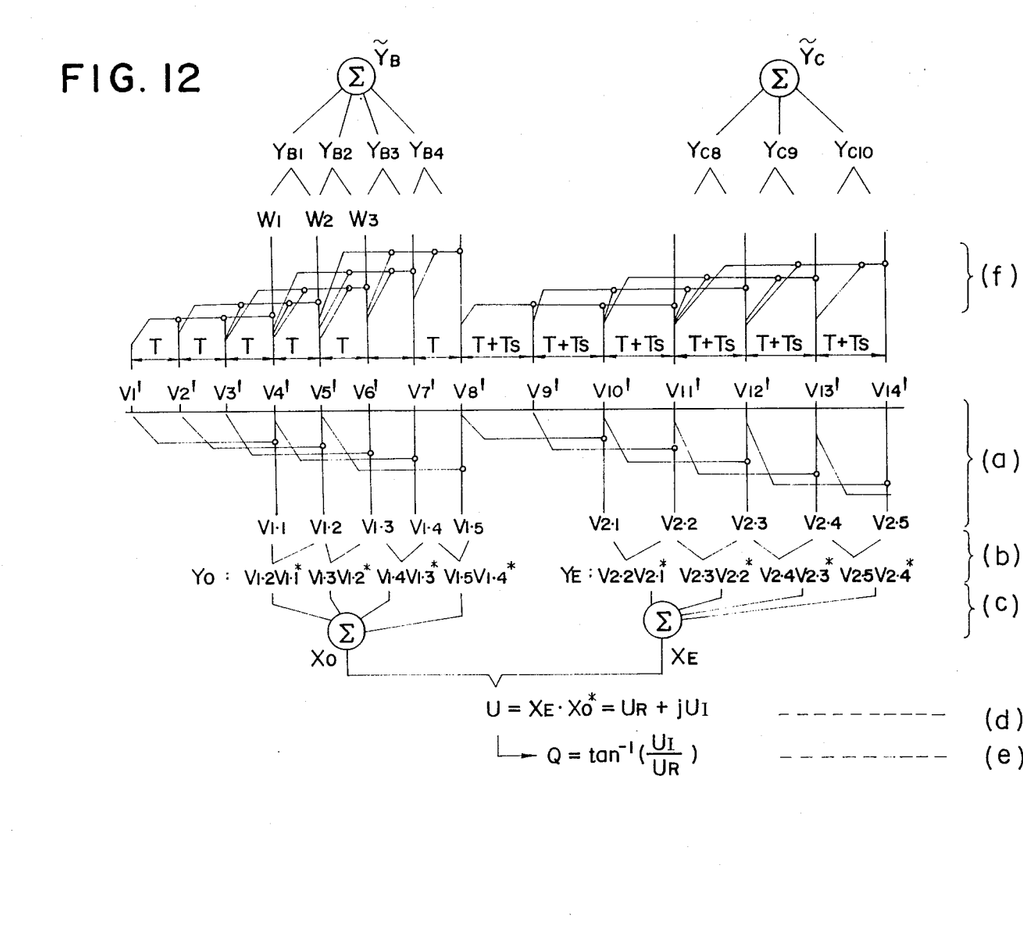

FIG. 12 is a conceptual diagram showing in detail the operation of FIG. 11. In the figure, indicated by v1' - v14' are phase vectors produced by the phase comparator 3. Of the vectors, v1' - v8' are phase vectors of the received signal pertinent to the transmission of interval T, and following v9' - v14' are phase vectors of the received signal pertinent to the transmission of interval T+Ts. Shown by (a) through (e) in the figure are the functions of the MTI filter 6-1, autocorrelator 7, complex adder 12, autocorrelator 8, and angle detector 26. Shown by (f) is the function of the MTI filter 6-2 which performs the third-order filtering process for the data of phase vectors v1' - v8' and the data of phase vectors v8' - v14', as follows.

$$Wn = v'_{n+3} + k_1 v'_{n+2} + k_2 v'_{n+1} + k_3 v'_n$$

$$(n=1-5) \quad (25)$$

$$W'n = V'_{n+3} + k'_1 V'_{n+2} + k'_2 v'_{n+1} + k'_3 V'_n$$

$$(n=8-11) \quad (26)$$

The data string Wn has a phase difference $\phi_B$ for a doppler angular frequency $\omega d$ of the moving object 5, as follows.

$$\phi_B = \omega dT \quad (27)$$

Whereas, the data string Wn' has a phase difference $\phi_C$, as follows.

$$\phi_C = \omega d(T+Ts) \quad (28)$$

A difference detecting circuit made up of delay element 44, autocorrelator 45, complex adder 46 and angle detector 47 performs calculation for evatuating the $\phi_B$ and $\phi_C$. The autocorrelator 45 performs the following correlation process.

$$Y_{Bn} = W_{n+1} \cdot W_n^* \quad (n=1, 2, 3, 4) \quad (29)$$

$$Y_{Cn} = W'_{n+1} \cdot W_n^* \quad (n=8, 9, 10) \tag{30}$$

The complex adder 46 produce avarage phase difference vectors $\widetilde{Y}_B$ and $\widetilde{Y}_C$ as follows.

$$Y_B = \sum_{n=1}^{4} Y_{Bn} \tag{31}$$

$$Y_C = \sum_{n=8}^{10} Y_{Cn} \tag{32}$$

The angle detector derive the deviation angle $\phi_B'$ of the vector $\widetilde{Y}_B$ and the deviation angle $\phi_C'$ of the vector $\widetilde{Y}_C$. The value $\phi_B'$ thus derived from the data string Wn does not exhibit a correct value of $\omega dT$ when the value of $\omega dT$ goes out of the range $-\pi$ to $\pi$ due to the aliasing of the value of angle. However, if $T/Ts = \eta$ is met, the difference vector U for two phase differences has its deviation angle Q provided by the angle detector 26 being equal to $\phi_B/\eta$, and the $\phi_B'$ can be modified to the correct value of $\phi_B$ by the value of Q even though the $\omega dT$ is outside the range $-\pi$ to $\pi$. The correction process for obtaining a correct phase difference $\phi_B$ from the actual value $\phi_B'$ based on the data string Wn is implemented by a modification circuit 42, as follows.

$$\phi_B = \phi_B' - 4\pi \quad \text{for} \quad -5\pi < \eta Q \leq -3\pi,$$
$$\phi_B = \phi_B' - 2\pi \quad \text{for} \quad -3\pi < \eta Q \leq -\pi,$$
$$\phi_B = \phi_B' \quad \text{for} \quad -\pi < \eta Q \leq \pi,$$
$$\phi_B = \phi_B' + 2\pi \quad \text{for} \quad \pi < \eta Q \leq 3\pi,$$
$$\phi_B = \phi_B' + 4\pi \quad \text{for} \quad 3\pi < \eta Q \leq 5\pi,$$

The above equations are generalized as follows.

$$\phi_B = \phi_B' + 2k\pi \text{ for } (2k-1)\pi < \pi Q \leq (2k+1)\pi, \tag{33}$$

In the same manner, the phase difference $\phi_C'$ produced actually from the data string Wn' is corrected to the phase difference $\phi_C$ by the modification circuit 42, as follows.

$$\phi_C = \phi_C' 2k\pi \text{ for } (2k-1)\pi < \gamma Q \leq (2k+1)\pi, \tag{34}$$

where $\gamma = (T+Ts)/Ts = \pi + 1$

The resulting values of $\phi_B$ and $\phi_C$ correctly represent the phase differences ascribed to the doppler effect, as given by equations (27) and (28), provided that the $\omega \cdot Ts$ is within the range $-\pi$ to $\pi$. The modification circuit 42 further evaluates the doppler angular frequency $\omega d$ sequentially, as follows.

$$\omega d = \phi_B/T \tag{35}$$

$$\omega d = \phi_C/(T+Ts) \tag{36}$$

Alternatively, the mean speed of $\widetilde{\omega d}$ the entire period of FIG. 12 may be calculated as follows.

$$\omega d = \tfrac{1}{2}\left(\frac{\phi_B}{T} + \frac{\phi_C}{T+Ts}\right) \tag{37}$$

A display unit 38 displays the resulting $\omega d$ or $\widetilde{\omega d}$ in terms of the moving speed of the object 5.

As described, the embodiment of FIG. 11 uses the phase difference obtained by the conventional manner through modification using the deviation angle Q of the difference vector U for two phase differences. The arrangement for obtaining the phase differences $\phi_B'$ and $\phi_C'$ is not limited to the use of an autocorrelator. Instead of the phase difference detecting circuit made up of blocks 44 to 47 in FIG. 11, it may be replaced with a FET analyzer performs Fourier transformation for the data strings Wn and Wn'. The use of the autocorrelator needs a larger number of data of Wn and Wn' than the case of using the autocorrelator.

It is also possible to evaluate the $\omega d$ by detecting only one of $\phi_B'$ and $\phi_C'$ and applying modification to it.

Although in the explanation of FIG. 12 the MTI filter 6-2 performs the third-order filtering process, it may be a second-order filter or fourth-order filter. In any case, although the MTI filter 6-2 in the arrangement of FIG. 11 provides different filtering characteristics for phase signals produced sequentially at transmission interval T and for phase signals produced sequentially at transmission interval T+Ts, the doppler angular frequency $\omega d'$ is calculated individually from each data string without involving any problem. This is the difference of the MTI filter 6-2 from the filter 6-1.

We claim:

1. A pulse doppler flow speed meter comprising:
    a sound wave transmission means for transmitting, a pulsed continued ultrasonic sound wave at at least a first and second transmission intervals interatively toward an object;
    sound wave reception means for detecting, a sound wave signal reflected by said object;
    phase detection means for detecting, a phase signal in the reflected signal by mixing the reflected signal at each reception with a reference signal;
    an MTI filter which performs filtering with the same filtering characteristics for phase signals corresponding to said first transmission interval and phase signals corresponding to said second transmission interval among the phase signals provided sequentially by said phase detection means by employing an unchanged delay time on respective filtering operations;
    first phase difference detecting means for detecting, sequentially a phase difference between a phase signal at the present time point and a phase signal at a preceding time point among phase signals passing sequentially through said MTI filter;
    second phase difference detection means for detecting, a phase difference between a first phase difference ascribed to said first transmission interval and a second phase difference ascribed to said second transmission interval among phase differences detected sequentially by said first phase difference detection means; and
    means for transforming the output of said second phase difference detection means into the speed of said object.

2. A pulse doppler flow speed meter according to claim 1, wherein said first and second transmission intervals take place alternately, and wherein said MTI filter including means for filtering based on the difference between the phase signal of a present time point and a phase signal of two time points ago.

3. A pulse doppler flow speed meter according to claim 1, wherein said first and second transmission intervals take place alternately, and wherein said MTI filter includes means for filtering by an operation using at least both of a phase signal of the present time point and a phase signal retarded for a sum of said first and second transmission intervals.

4. A pulse doppler flow speed meter according to claim 1, wherein said first transmission interval (T) and said second transmission interval (T+Ts) have an interval ratio p:q and said first and second transmission intervals each take place for a plurality of number of times consecutively, and wherein said MTI filter includes means for filtering by an operation using at least both a phase signal of the present time point and a phase signal retarded for Td which is given by the following equation:

$$Td = r \cdot T = s(T+Ts)$$

where $r=c/q$, $s=c/p$, and c is a common multiple of p and q which provided an integral ratio.

5. A pulse doppler flow speed meter according to claim 1, wherein said sound wave transmission means has a further period of transmission in which said second transmission interval and a third transmission interval take place alternately.

6. A pulse doppler flow speed meter according to claim 5, wherein said sound wave transmission means has a further period of transmission in which said third transmission interval and a fourth transmission interval take place alternately.

7. A pulse doppler flow speed meters comprising:
sound wave transmission means for transmitting, a pulsed continuous ultrasonic sound wave at a first transmission interval toward an object for a plurality of number of time and for transmitting a pulsed continuous ultrasonic sound wave at a second transmission interval toward said object for a plurality of number of times;
sound wave reception means for detecting a sound wave signal reflected by said object;
phase detection means for detecting a phase signal in the reflected signal by mixing the reflected signal at each reception with a reference signal;
a first MTI filter which performs filtering with the same filtering characteristics for phase signals corresponding to said first transmission interval and phase signals corresponding to said second transmission interval among the phase signals provided sequentially by said phase detection means by employing an unchanged delay time on respective filtering operations;
first phase difference detection means for detecting sequentially a phase difference between a phase signal at the present time point and a phase signal at a preceding time point among phase signals passing sequentially through said MTI filter;
second phase difference detection means for detecting a phase difference between a first phase difference ascribed to said first transmission interval and a second phase difference ascribed to said second transmission interval among the phase differences detected sequentially by said first phase difference detection means;
a second MTI filter which eliminates stationary object signals in the phase signals provided sequentially by said phase detection means;
third phase difference detection means for detecting a phase difference based on at least one of a first set of phase signals corresponding to said first transmission interval and a second set of phase signals corresponding to said second transmission interval among the phase signals passing sequentially through said second MTI filter;
modification means for modifying the output of said third phase difference detection means using the output of said second phase difference detection means; and
means for transforming the modified phase difference into the speed of said object.

8. A pulse doppler flow speed meter according to claim 7, wherein said second MTI filter including means for performing a filtering process of second order or higher.

9. A pulse doppler flow speed meter according to claim 7, wherein said third phase difference detection means including means for detecting phase differences based on the first and second sets of phase signals.

* * * * *